United States Patent [19]
Kasser

[11] Patent Number: 6,078,800
[45] Date of Patent: Jun. 20, 2000

[54] METHOD AND DEVICE FOR REDUCING RF TRANSMISSION INTERFERENCE AND USE THEREOF IN AN INTERACTIVE TELEVISION NETWORK

[75] Inventor: Pierre Kasser, Saverne, France

[73] Assignee: Telediffusion de France, Paris, France

[21] Appl. No.: 08/875,774

[22] PCT Filed: Dec. 3, 1996

[86] PCT No.: PCT/FR96/01917

§ 371 Date: Sep. 25, 1997

§ 102(e) Date: Sep. 25, 1997

[87] PCT Pub. No.: WO97/21277

PCT Pub. Date: Jun. 12, 1997

[30] Foreign Application Priority Data

Dec. 6, 1995 [FR] France .................................. 95 14417

[51] Int. Cl.[7] .................................................. H04B 1/10
[52] U.S. Cl. .......................... 455/303; 455/63; 455/12.1; 348/21
[58] Field of Search .............................. 348/21; 455/11.1, 455/12.1, 24, 63, 67.1, 67.3, 67.6, 132, 137–138, 272, 276.1, 278.1, 296, 303–304, 427–428, 430, 501, 504–506

[56] References Cited

U.S. PATENT DOCUMENTS

| | | |
|---|---|---|
| 4,308,621 | 12/1981 | Mendelson . |
| 5,093,839 | 3/1992 | Kohno et al. ............................ 375/200 |
| 5,440,308 | 8/1995 | Dybdal et al. ................... 455/278.1 X |
| 5,535,432 | 7/1996 | Dent .................................. 455/12.1 X |
| 5,568,523 | 10/1996 | Tsujimoto ........................... 455/138 X |
| 5,818,517 | 10/1998 | Hudson et al. ........................... 348/21 |

FOREIGN PATENT DOCUMENTS 570 166 A1  11/1993  European Pat. Off. .

Primary Examiner—William G. Trost
Attorney, Agent, or Firm—Larson & Taylor

[57] ABSTRACT

A method and device are provided for reducing RF transmission interference to a wanted signal of an interactive TV network which is impaired by an interfering signal present on a terrestrial and satellite RF network. The wanted signal is received in the presence of the interfering signal so as to obtain a received wanted signal in the presence of the interferer. The interfering signal transmitted by the satellite network is duplicated and delayed so as to obtain a received interfering signal similar to the interfering signal present with the wanted signal. The received interfering signal is subtracted from the wanted signal in the presence of the interfering signal, so as to deliver a received wanted signal free of interfering signal.

2 Claims, 4 Drawing Sheets

| | | |
|---|---|---|
| A | 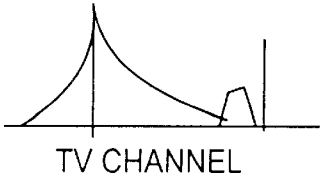<br>TV CHANNEL | RSBM MODULATED CONVENTIONAL RF TV CHANNEL INTERFERER |
| B | <br>SATELLITE TV CHANNEL | FM MODULATED SATELLITE TV CHANNEL INTERFERER |
| | 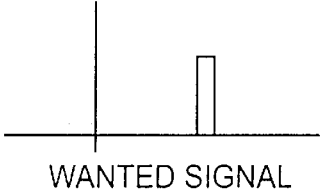<br>WANTED SIGNAL | WANTED DIGITAL SIGNAL TRANSMITTED IN THE BAND OF THE WANTED RF TV CHANNEL |
| C | 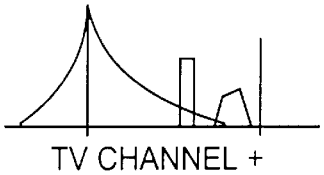<br>TV CHANNEL + WANTED SIGNAL | SUPERPOSITION OF THE WANTED DIGITAL CHANNEL IN THE SPECTRUM OF THE RF TV CHANNEL |
| D | 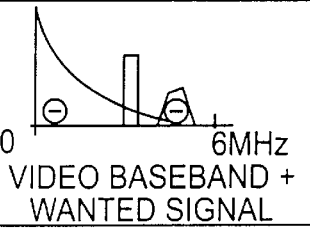<br>0  6MHz<br>VIDEO BASEBAND + WANTED SIGNAL | RECOVERY OF THE COMPOSITE VIDEO SIGNAL WITH THE RSBM DEMODULATED DIGITAL SIGNAL |
| E | 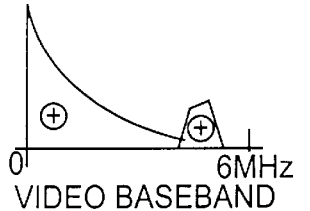<br>0  6MHz<br>VIDEO BASEBAND | RECOVERY OF THE FM DEMODULATED COMPOSITE VIDEO SIGNAL |
| F | 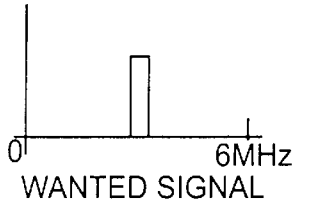<br>0  6MHz<br>WANTED SIGNAL | WANTED DIGITAL SIGNAL RIDDED OF THE INTERFERING TV SPECTRUM AFTER SUBTRACTION AND READY TO BE DEMODULATED FOR APPLICATION THEREOF |

FIG. 3.

METHOD AND DEVICE FOR REDUCING RF TRANSMISSION INTERFERENCE AND USE THEREOF IN AN INTERACTIVE TELEVISION NETWORK

The invention relates to a method and a device for reducing RF transmission interference in a monofrequency or multifrequency network.

Transmission networks, such as radio broadcasting or TV broadcasting networks include a source terrestrial station from which the radio broadcast or TV broadcast programs are compiled, transmitted to a telecommunications satellite, this telecommunications satellite forwarding these programs on to terrestrial stations for receiving/retransmitting on a terrestrial RF network. The terrestrial RF network comprises a plurality of retransmitting stations each equipped with an SA satellite receiving antenna, a receiver and a transmitter linked to a transmission aerial covering a specified terrestrial geographical area. Two retransmitting stations $S_1$, $S_2$ are normally spaced a distance of the order of at most 150 km apart. In the case of an interactive television RF network, a user, located between two retransmitting stations $S_1$, $S_2$, is required to transmit interactive signals at a frequency $F_1$ to the closer transmitting station $S_1$ so as to allow the interactive screening of a TV program for example with the source terrestrial station, or any intermediate station provided, as the case may be, for this purpose. The user receives the TV program at a frequency $F_2$ from the closer transmitting station $S_2$.

However, the signals transmitted by the user at the frequency $F_1$ are subject, from the distant transmitting stations $S_2$, to a phenomenon of interference at a similar or identical frequency, by virtue of the much greater transmitting power of these transmitting stations and of the limited frequency space allocated to these terrestrial RF networks. The transmitting station which is pertinent to the relevant user, the station $S_1$, therefore receives the wanted signal at the frequency $F_1$ generated by the user and an interfering signal at this same frequency $F_1$ or at a very similar frequency.

At the present time, there is no device or technique making it possible to ensure a systematic reduction of the aforesaid interference, other than those which employ rejector systems creating a filtering in the wanted frequency band received or causing a rejection with regard to the antenna pattern in the direction of the interferer. These rejector systems are however inefficient if the signal due to the interferer exhibits a frequency bandwidth greater than that of the wanted signal or if the wanted signal originates from the same direction as the interferer.

The present invention aims to remedy the aforesaid drawback.

Its object is the implementation of a device for reducing RF interference exploiting the fact of the simultaneous presence of the same signal, contributing to the interference signal, on two different transmission media, these signals, although generally possessing different spectral characteristics, nevertheless transport the same information.

The method and the device for reducing the RF transmission interference to a wanted signal, transmitted to a receiver, this wanted signal being impaired by an interfering signal, present simultaneously, to within the propagation time, on a terrestrial and satellite RF network, which are the subjects of the present invention, are noteworthy in that they implement, at reception level, a first path for receiving the wanted signal in the presence of the interfering signal, delivering a wanted signal received in the presence of the interferer, a second path for receiving the interfering signal generated by delayed duplication of the interfering signal transmitted by the satellite network, delivering a received interfering signal similar to the interfering signal present in the first path with the wanted signal and means subtracting the received interfering signal from the wanted signal in the presence of the interfering signal, this making it possible to deliver a received wanted signal free of interfering signal.

The device for reducing RF interference, which is the subject of the present invention, finds application to the implementation and operation of RF radio networks or telebroadcasting of radio or television programs.

They are better understood on reading the description and observing the drawings in which, apart from FIG. 1 relating to the prior art, FIG. 2a represents a schematic diagram of a device for reducing RF interference installed in a transmission network of multifrequency type;

FIG. 3 represents, in an amplitude/frequency chart, the shape of the frequency spectra of the signals obtained at various test points of FIG. 2b, in the case in which these signals are TV signals.

Figure 1:
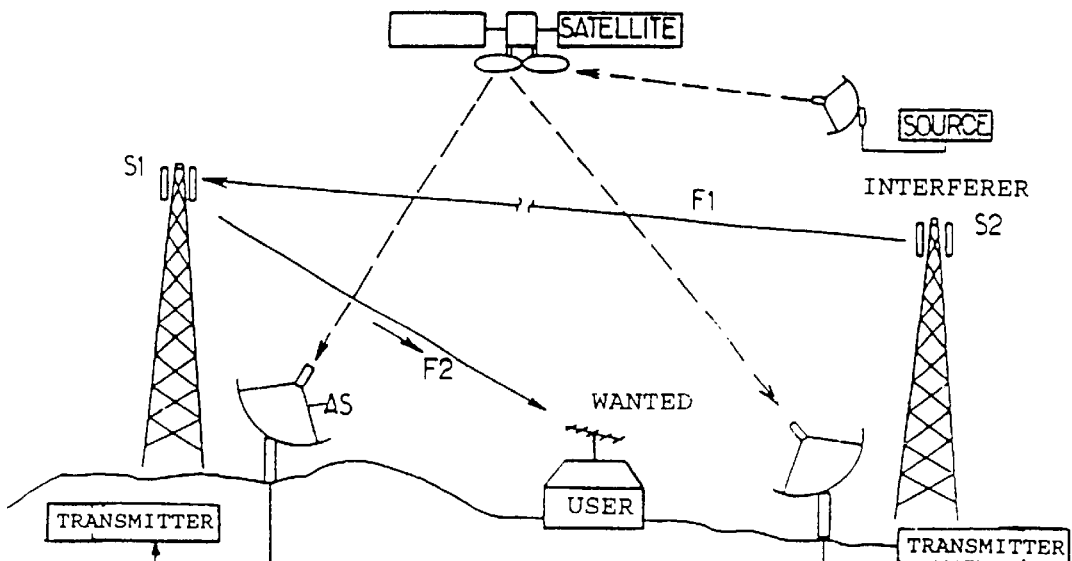

A more detailed description of the device for reducing RF transmission interference to a wanted signal, this signal being transmitted by a user to a receiver of a transmitting station, the station $S_1$ in FIG. 1, this wanted signal being impaired by an interfering signal present simultaneously to within the propagation time on a terrestrial and satellite RF network, as represented in the aforesaid FIG. 1, will now be given in conjunction with FIG. 2a.

As represented diagrammatically in the aforesaid figure, the device, which is the subject of the present invention, comprises at the reception level of the aforesaid transmitting station $S_1$ a first path $V_1$ for receiving the wanted signal, in the presence of the interfering signal, this first path delivering a wanted signal received in the presence of the interferer and a second path $V_2$ for receiving the interfering signal, generated by delayed duplication of the interfering signal transmitted by the satellite network. The second path $V_2$ delivers a received interfering signal similar to the interfering signal present in the first path $V_1$ with the wanted signal.

Furthermore, the device which is the subject of the invention, comprises a module subtracting the received interfering signal from the wanted signal in the presence of the interfering signal, this making it possible to deliver, for example to a transmitter of the transmitting station $S_1$, a received wanted signal free of interfering signal with a view to the forwarding of this received wanted signal on to the source terrestrial station, for example, or to an intermediate station.

Figure 2A:
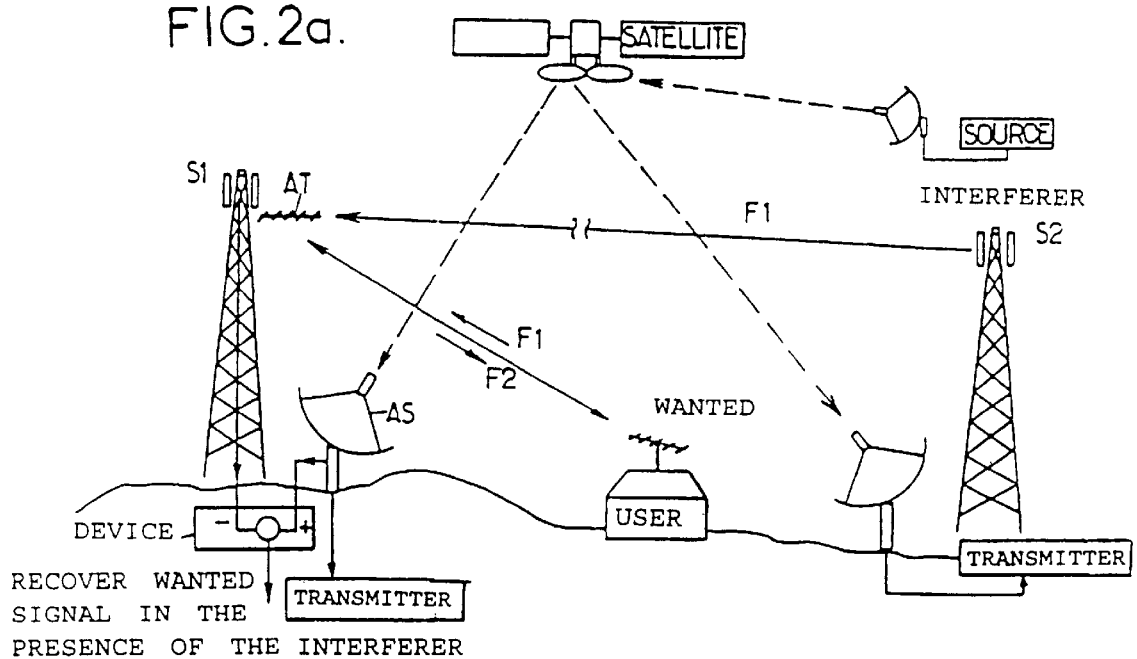
FIG. 2b represents an embodiment detail of the device, which is the subject of the present invention.
FIG. 2c represents an illustrative diagram for implementing the method for reducing RF interference, which is the subject of the present invention.

Generally, it is indicated that the device, which is the subject of the present invention, is composed of two systems of aerials, a TA aerial for receiving terrestrial RF signals which receives the signal transmitted by the user, that is to say the wanted signal at the frequency $F_1$ and the signal transmitted by the interferer, that is to say the signal transmitted at the same frequency $F_1$ or at a very similar frequency by the interferer, i.e. by the transmitting station $S_2$ of the same RF network, and an aerial for receiving the RF signals transmitted by the satellite, the SA antenna in FIG. 2a, normally present, for example, in the facilities of the transmitting station $S_1$.

of course, each path $V_1$, $V_2$ also includes corresponding demodulation equipment as will be described later in the description.

The signals thus received by the paths $V_1$ and $V_2$ are baseband demodulated, then temporally aligned by a delay compensator device, locked exactly onto the difference in the propagation time of the signals.

It is indicated that this delay is bound solely to the time for propagation and for processing between the interfering transmitter site of the transmitting station $S_2$ and the receiving site, the transmitting station $S_1$, owing to the almost synchronous feeding of the two transmitting station sites with the same satellite signal. It is thus indicated that the distance of 150 km which separates the transmitting stations $S_1$ and $S_2$ is negligible compared with the distance of a satellite such as a geostationary satellite, for example, from the earth's surface. The aforesaid delay in respect of two transmitting sites or stations separated by a distance of between 100 and 150 km may be of the order of 500 $\mu$sec.

Generally, the signal received by satellite under good propagation conditions, at the level of the transmitting station $S_1$, is preferably delayed since this signal is received with optimal quality, superior to that of the signal transmitted by the terrestrial RF network.

Generally, it is indicated that the signals delivered by each path $V_1$ and $V_2$ are then temporally aligned baseband signals, which are added together in phase opposition by means of a 0-$\pi$ coupler for example.

A more detailed description of the device, which is the subject of the present invention, consisting of the first and the second reception path and of the aforesaid subtracting means, will now be given in conjunction with FIG. 2b.

As represented in the aforesaid figure, the first path $V_1$ comprises, for example, advantageously, connected in cascade: the terrestrial receiving antenna denoted TA, a baseband demodulator of conventional type, an equalizing device making it possible to carry out an equalization processing of conventional type, that is to say amplitude and frequency equalization. The equalizing circuit is followed by an inventor circuit with gain -1.

Likewise, the second path comprises, connected in cascade, the SA satellite receiving antenna, a baseband satellite channel demodulator of conventional type, this demodulator being followed by an equalizing device also making it possible to carry out an equalization processing of the demodulated signals both in terms of amplitude and frequency.

The equalizing circuit is then followed by a delayer circuit making it possible to compensate for the propagation time of the transmitted interfering signal and to deliver the received interfering signal.

A 0-$\pi$ coupler receives on its input ports the received interfering signal and the interfering signal plus the wanted signal which are delivered respectively by the second path $V_2$ and the first path $V_1$ so as to deliver the wanted signal, that is to say the signal initially transmitted by the user.

This wanted signal can then be delivered for example to a collecting network, not represented, with a view to transmission to the source station or to any intermediate station suitable for ensuring the interactive screening of the TV program thus broadcast.

In order to align the amplitude of the received interfering signals having undergone different channel distortions, it is preferable to resort to an equalizing device allowing high-performance alignment processing of the levels of the signals to be subtracted with regard to the wanted signal bandwidth to be recovered.

The actual gain in the interference, that is to say ultimately rejection of the interference signal, depends strongly on the amplitude- and frequency-alignment of the signals received, as well, of course, as on the compensation or on the time offset effected with regard to the interfering signal received by the satellite RF network. In particular, when the network used is a television network of interactive type, the aforesaid alignments may advantageously be implemented with good accuracy by virtue of the presence of the test signals, which then allow perfect calibration of the equalization and delay compensation processing.

Figure 2B:
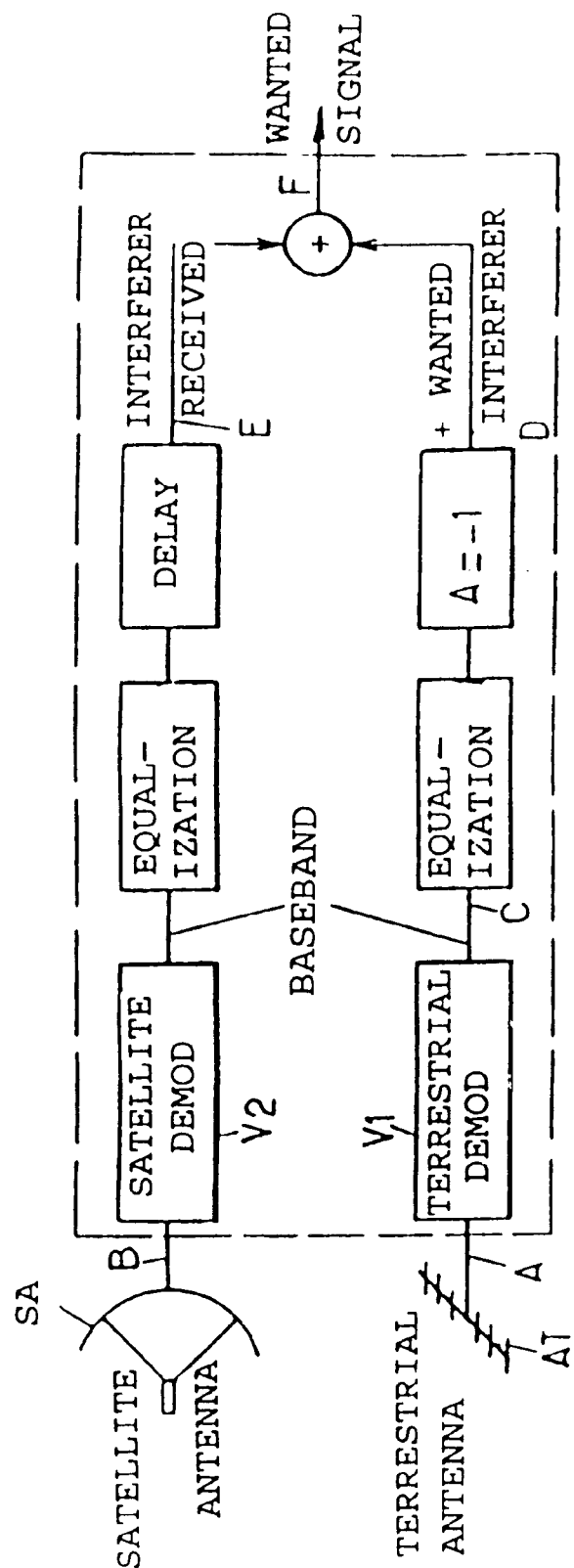
Figure 2C:
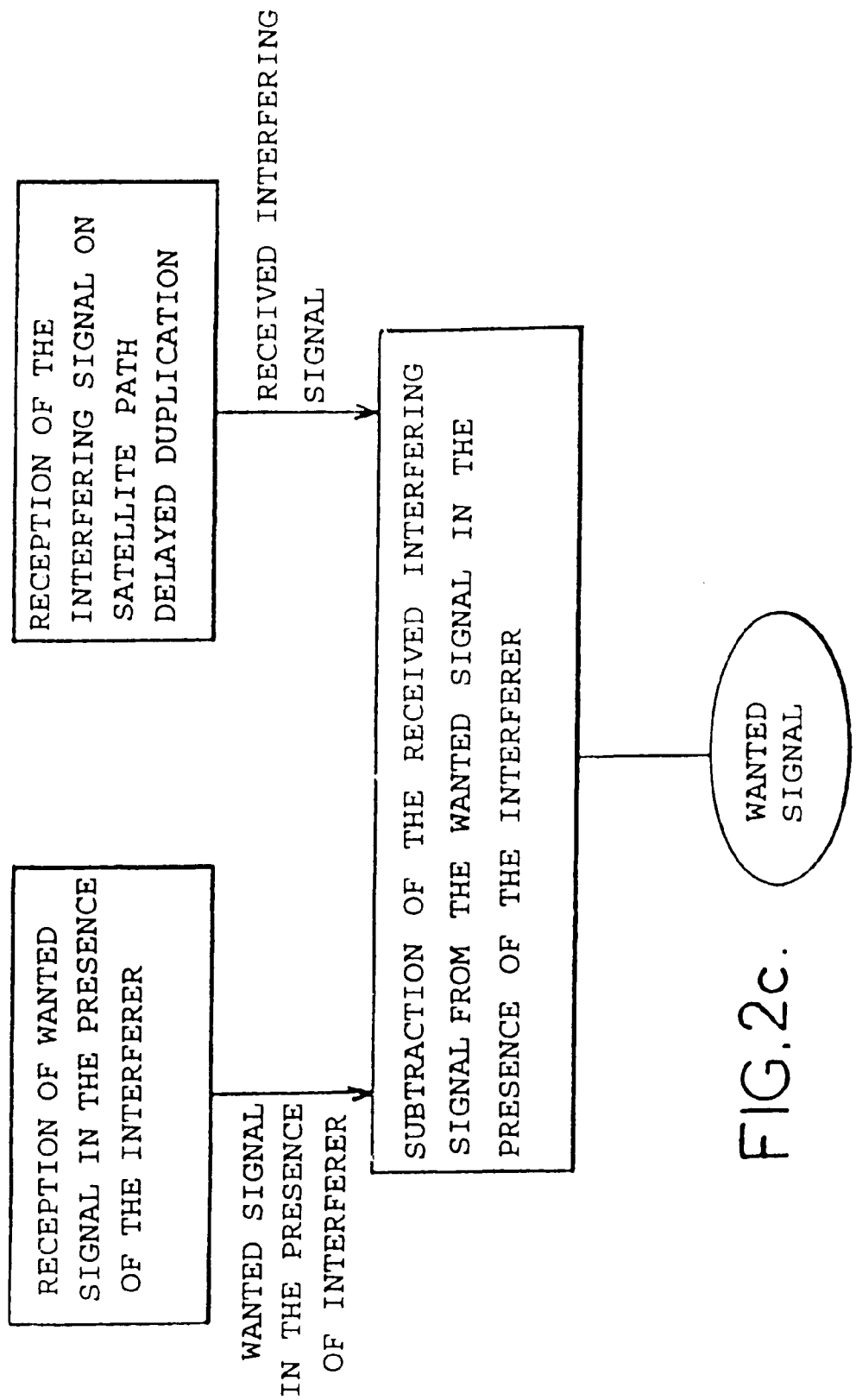

Finally, as represented in FIG. 2c, the method, which is the subject of the invention, consists in, simultaneously, receiving the wanted signal in the presence of the interfering signal so as to obtain a wanted signal received in the presence of the interferer, receiving the interfering signal generated by delayed duplication of the interfering signal transmitted by the satellite network so as to obtain a received interfering signal, similar to the interfering signal present with the wanted signal. The received interfering signal is subtracted from the wanted signal in the presence of the interfering signal so as to deliver a received wanted signal free of interfering signal.

Represented in FIG. 2b are test points A to F, located respectively in alphabetical order at the output of the terrestrial antenna TA, at the output of the satellite antenna SA, at the output of the terrestrial demodulator of the first path, at the output of the amplifier with gain -1 of this same first path, at the output of the delay compensation circuit on the second path and yielding the received interfering signal and finally, at the output of the 0-$\pi$ coupler delivering the wanted signal after rejection of the received interfering signal.

Represented in FIG. 3 by way of non-limiting example is the frequency spectrum of the signal received at the aforesaid test point A, that is to say at the output of the terrestrial antenna TA. This signal is represented for a conventional RF television channel, modulated by RSEM modulation standing for "reduced sideband modulation". The spectrum of the interferer is superimposed on the spectrum of the television signals for the high frequencies thereof.

Represented at the point B is the spectrum of the interfering signal obtained at the output of the satellite antenna SA for a satellite TV channel modulated by frequency modulation.

The aforesaid signal is followed by a representation of the spectrum of the wanted signal transmitted by the user, that is to say of the wanted digital signal transmitted in the band of the RF TV channel at the frequency $F_1$ to the transmitting station $S_1$.

Represented at the point C is the superposition of the spectra of the signals of the wanted digital channel in the spectrum of the RF TV channel after baseband demodulation, the overall spectrum corresponding to the superposition of the spectra of the signals at the point A and of the wanted signal transmitted by the user.

Represented at the point D is the spectrum of the video baseband signal for the interfering signal plus the wanted signal after 180° phase shifting, that is to say application of a gain equal to -1, the sign—at the point D of FIG. 3 symbolizing amplification by a gain equal to -1.

Represented at the point E is the spectrum of the received interfering signal after delay compensation and, of course, video baseband demodulation, such a signal, in the absence of a negative gain equal to -1 corresponding to the signal of opposite sign obtained at the point D for the interfering signal and for this reason symbolically bearing the sign +, this signal being obtained after FM demodulation, of course.

Represented at point F is the sum, by virtue of the 0π coupler, algebraic sum of the signal represented at the point D and the signal represented at the point E, the signal delivered at the point F corresponding to that of the spectrum of the wanted signal alone, the digital signal ridded of the interfering TV spectrum, after subtraction, it then being possible for this signal to be demodulated for use or application thereof within the framework of the broadcasting of the interactive TV program mentioned earlier.

Thus has been described a device for reducing the RF transmission interference to a wanted signal in a network such as an interactive TV network, for example, in which, by virtue of the demodulation of each radio-frequency signal received in its standard and its original modulation, of the time- and amplitude-alignment of the baseband signals obtained, following this demodulation, and then of the subtraction of the signals thus obtained, the interfering signal can thus be substantially attenuated or eliminated. Conversely, any superimposed wanted signal in the spectrum of one of the channels received is not suppressed by the subtraction thus effected and can be recovered for subsequent applications.

The device, which is the subject of the present invention, makes it possible to improve the spectral efficiency of a radio broadcasting band by rendering the latter apt for the transmission of new services, irrespective of the occupancy thereof.

I claim:

1. A device for reducing RF transmission interference to a wanted signal, transmitted to a receiver, said wanted signal being impaired by an interfering signal present simultaneously, apart from propagation time, on a terrestrial and a satellite RF network, said device comprising, at a reception level:

a first path for receiving said wanted signal in the presence of said interfering signal and for delivering a wanted signal received in the presence of the interfering signal, said first path comprising, connected in cascade: a terrestrial receiving antenna, a baseband demodulator, an equalization device, and an inverter circuit with gain −1;

a second path for receiving said interfering signal generated by delayed duplication of the interfering signal transmitted by said satellite RF network, and for delivering a received interfering signal similar to said interfering signal present with said wanted signal in said first path, said second path comprising, connected in cascade: a satellite receiving antenna, a baseband satellite channel demodulator, an equalization device, and a delay circuit for compensating for the propagation time of said transmitted interfering signal and for delivering said received interfering signal; and means for subtracting said received interfering signal from said wanted signal in the presence of said interfering signal so as to produce a received wanted signal free of interfering signal.

2. A method of reducing the transmission interference arising in a wanted signal transmitted to a receiver and impaired by an interfering signal present simultaneously, apart from propagation time, on a terrestrial and a satellite RF network, said method comprising the simultaneous steps of:

receiving from said terrestrial network, said wanted signal in the presence of said interfering signal and demodulating said wanted signal in the presence of said interfering signal so as to deliver a demodulated wanted signal received in the presence of the interfering signal;

receiving, by delayed duplication, said interfering signal transmitted by said satellite network, and demodulating said interfering signal so as to deliver a received demodulated interfering signal similar to said interfering signal present with said wanted signal; and subtracting said received demodulated interfering signal from said demodulated wanted signal received in the presence of said interfering signal so as to produce a received wanted signal free of interfering signal.

* * * * *